United States Patent
Song et al.

(10) Patent No.: US 9,503,453 B2
(45) Date of Patent: Nov. 22, 2016

(54) OTP-BASED AUTHENTICATION SYSTEM AND METHOD

(71) Applicant: SAMSUNG SDS CO., LTD., Seoul (KR)

(72) Inventors: Seong Dae Song, Pyeongtaek-si (KR); Han Eung Hwang, Seoul (KR); Seung Kuk Kim, Seoul (KR)

(73) Assignee: SAMSUNG SDS CO., LTD., Seoul (JP)

( * ) Notice: Subject to any disclaimer, the term of this patent is extended or adjusted under 35 U.S.C. 154(b) by 3 days.

(21) Appl. No.: 14/411,680

(22) PCT Filed: Jun. 21, 2013

(86) PCT No.: PCT/KR2013/005471
§ 371 (c)(1),
(2) Date: Dec. 29, 2014

(87) PCT Pub. No.: WO2014/003362
PCT Pub. Date: Jan. 3, 2014

(65) Prior Publication Data
US 2015/0172280 A1    Jun. 18, 2015

(30) Foreign Application Priority Data

Jun. 28, 2012 (KR) .................. 10-2012-0069910

(51) Int. Cl.
| | |
|---|---|
| H04L 29/00 | (2006.01) |
| H04L 29/06 | (2006.01) |
| H04L 9/08 | (2006.01) |
| H04L 9/32 | (2006.01) |
| G06F 21/31 | (2013.01) |

(52) U.S. Cl.
CPC .......... *H04L 63/0838* (2013.01); *G06F 21/31* (2013.01); *H04L 9/0861* (2013.01); *H04L 9/0863* (2013.01); *H04L 9/32* (2013.01); *H04L 9/3228* (2013.01); *H04L 9/3297* (2013.01)

(58) Field of Classification Search
CPC ........... G04L 9/08; G04L 9/32; G04L 63/08; G04L 63/10
USPC ................ 726/1–10, 26–30; 713/168–186
See application file for complete search history.

(56) References Cited

U.S. PATENT DOCUMENTS

| | | | | |
|---|---|---|---|---|
| 6,694,431 | B1* | 2/2004 | Binding | H04L 63/0428 713/152 |
| 8,412,928 | B1* | 4/2013 | Bowness | H04L 63/0838 713/155 |
| 8,572,684 | B1* | 10/2013 | Sama | H04L 9/3228 726/2 |
| 2002/0166048 | A1* | 11/2002 | Coulier | H04L 63/0435 713/169 |

* cited by examiner

*Primary Examiner* — Madhuri Herzog
(74) *Attorney, Agent, or Firm* — Sughrue Mion, PLLC

(57) ABSTRACT

Disclosed is an authentication system and method. The authentication system according to one embodiment of the present disclosure comprises a transceiver for receiving an authentication request including a client-side OTP and encoded account information from a client, and transmitting the result of the authentication performed in accordance with the authentication request to the client; a decoder for decoding the encoded account information so as to compute the account information of the client and an authentication request time; a server-side OTP generator for generating a server-side OTP using the computed account information of the client and authentication request time; and an authenticator for comparing the client-side OTP included the authentication request and the server-side OTP in order to authenticate the client.

7 Claims, 2 Drawing Sheets

100

102

104

400

OTP-BASED AUTHENTICATION SYSTEM AND METHOD

TECHNICAL FIELD

The present disclosure relates to a technology for security and authentication of a system on a network.

BACKGROUND ART

A one-time password (OTP) is one of network security technologies, which is a security system that requires a new password whenever a user desires to receive authentication. This system is intended to solve a serious security problem occurring when a fixed password is leaked in a general ID/password-based security system. Recently, the system is increasingly used in an enterprise or financial institution which requires high-level security.

The OTP has several types such as an S/Key type, a challenge/response type, a time synchronization type, and the like, among which the time synchronization type uses time to generate a single-use password, as seen from its name. When a user generates a client-side OTP and delivers the generated client-side OTP to an authentication server together with a PIN (a user password, a secret key), the server uses an init-secret and PIN of a user corresponding to an ID of the client to generate a server-side OTP and check whether the generated server-side OTP is consistent with the received client-side OTP. In the time synchronization type, since the authentication server and the user should enter the same time as an OTP input value, user authentication cannot but fail if time between the authentication server and the user token is not the same. However, it is practically difficult to always synchronize the user terminal with the server. Accordingly, in many cases, an error range of the time is set, and if the time is within the error range, authentication is considered successful. For example, the authentication server sets an effective range of a certain time (for example, −180 sec to +180 sec) before and after a time when a request for authentication is received from a user and determines that the authentication has succeeded when one of server-side OTPs that are generated as time information in the effective range is consistent with an OTP of a user.

However, the authentication server needs to generate a number of OTPs according to the effective time range, thus increasing a burden at the server side. In particular, since the OTP is encoded using MD5 and the like, an overhead caused by generating the OTP is greater than that of a general password type. For example, if n server-side OTPs are generated in the effective range, it takes a time $O(n)$ to authenticate one client. Furthermore, if m devices are registered for each client, the authentication process should be repeatedly performed on each device and thus it takes a time $O(n*m)$ to authenticate one client.

DISCLOSURE

Technical Problem

The present disclosure is directed to providing a method for improving processing performance of an authentication server in a time synchronization type OTP authentication system.

Technical Solution

One aspect of the present disclosure provides an authentication system including: a transceiving module configured to receive an authentication request including a client-side OTP and encoded account information from a client and transmit an authentication result in response to the authentication request to the client; a decoding module configured to decode the encoded account information to compute account information of the client and an authentication request time; a server-side OTP generating module configured to generate a server-side OTP using the computed account information of the client and authentication request time; and an authentication module configured to compare the client-side OTP included in the authentication request and the server-side OTP to authenticate the client.

Another aspect of the present disclosure provides an authentication method including: receiving, by an authentication server, an authentication request including a client-side OTP and encoded account information from a client; decoding, by the authentication server, the encoded account information to compute account information of the client and an authentication request time; generating, by the authentication server, a server-side OTP using the computed account information of the client and authentication request time; and comparing, by the authentication server, the client-side OTP the client-side OTP included in the authentication request and the server-side OTP to authenticate the client.

Advantageous Effects

According to embodiments of the present disclosure, an accurate authentication request time may be found using an authentication request transmitted from a client, thus significantly reducing a time taken to process an authentication. That is, in an environment in which there are m devices for respective users, when the OTP is verified for each of n candidate time periods, in a related art, it takes a time $O(m*n)$. However, according to the present disclosure, the verification may be performed within a time $O(m+n)$.

Furthermore, according to embodiments of the present disclosure, account information is encoded and then transmitted to an authentication server. Accordingly, a user account may not be revealed during a message transceiving process for authentication, thus enforcing security in addition to reducing the authentication time.

MODES OF THE INVENTION

Hereinafter, embodiments of the present disclosure will be described in detail with reference to the accompanying drawings. However, this is only exemplary, and the present disclosure is not limited thereto.

In describing the present disclosure, when a detailed description of known techniques associated with the present disclosure unnecessarily obscures the gist of the present disclosure, it is determined that the detailed description thereof will be omitted. Also, the terms described below are defined with consideration of the functions in the present disclosure, and thus may vary depending on a user, intention of an operator, or custom. Accordingly, the definition would be made on the basis of the whole specification.

The technical scope of the present disclosure is defined by the claims, and the following embodiments are intended only to explain the technical scope of the present disclosure to those who skilled in the art.

Figure 1:
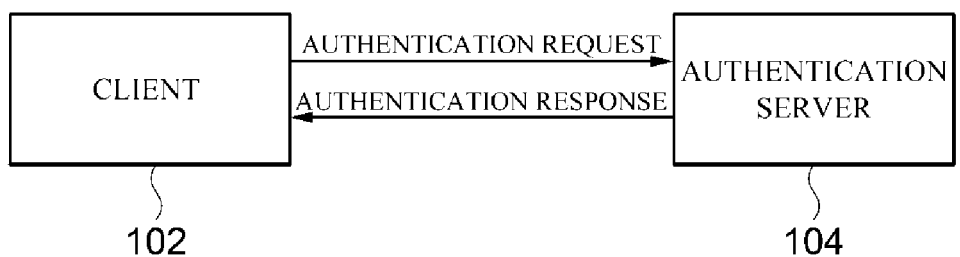
FIG. 1 is a block diagram for describing an authentication system 100 according to an embodiment of the present disclosure.

FIG. 1 is a block diagram for describing an authentication system 100 according to an embodiment of the present disclosure. As shown in FIG. 1, the authentication system 100 according to an embodiment of the present disclosure includes a client 102 and an authentication server 104. The client 102 and the authentication server 104 are connected with each other over a wired or wireless network and configured to transmit and receive data.

The client 102 requests the authentication server 104 to authenticate a user of the client 102 and receives an authentication result in response to the authentication request (an authentication response) from the authentication server 104. The authentication request includes a client-side OTP and encoded account information. First, the client 102 generates the client-side OTP using account information AO of the user, an access token of the client 102, and authentication request time information $T_a$. An OTP generating algorithm is well known to a person skilled in the art. However, details thereof are excluded from the scope of the present disclosure, and thus detailed description thereof will be omitted.

In addition, the client 102 generates account information $A_e$ that is encoded separately from the client-side OTP. Specifically, the client 102 generates an account encoding key $K_a$ from the authentication request time information $T_a$ using a previously set key generating algorithm and encodes the account information $A_o$ using the account encoding key $K_a$. Subsequently, the client 102 transmits an authentication request including the generated client-side OTP and the encoded account information $A_e$ to the authentication server.

The authentication server 104 receives the authentication request from the client 102 and returns a result of authenticating the client 102 in response to the received authentication request to the client 102. First, the authentication server 104 shares the account information of a user of the client 102 and the access token of the client 102 with the client and stores the account information and the access token. In this case, when the user uses a plurality of client devices, the authentication server 104 stores each device together with its access token.

When the authentication request is received from the client 102, the authentication server 104 decodes the encoded account information included in the received authentication request to compute the account information $A_o$ of the client 102 and the authentication request time $T_a$. First, the authentication server 104 generates a plurality of estimated OTP generation times based on an authentication request reception time. For example, the authentication server 104 may generate an estimated OTP generation time every 10 seconds for 180 seconds before and after the time when the authentication request is received from the client 102, which may vary depending on an OTP policy of the authentication server 104.

Next, the authentication server 104 generates a decoding key using a key generating algorithm for each estimated OTP generation time. In this case, since the decoding key is intended to decode the account information encoded by the client side, the same key generating algorithm as that of the client 102 needs to be used.

When the decoding key is generated, the authentication server 104 attempts to decode the encoded account information using the decoding key. In this case, when one of a plurality of decoding keys used for decoding is the same as a key used for encoding at the client 102, as a result of the decoding, original account information $A_o$ that is not encoded is derived, and the authentication server 104 estimates an estimated OTP generation time corresponding to the decoding key as an actual authentication request time $T_a$. That is, the present disclosure has an advantage of inferring an accurate authentication request time by decoding the encoded account information.

When the account information $A_o$ and the authentication request time $T_a$ are computed though the process, the authentication server 104 generates a plurality of server-side OTPs for respective access tokens using the account information $A_o$, the authentication request time $T_a$, and access token values for respective devices of users, compares the generated server-side OTPs with a client-side OTP, and determines that the authentication has succeeded when there is a server-side OTP consistent with the client-side OTP. However, when the received client-side OTP is not consistent with any one of the server-side OTPs, the authentication server 104 determines that the authentication fails.

Figure 2:
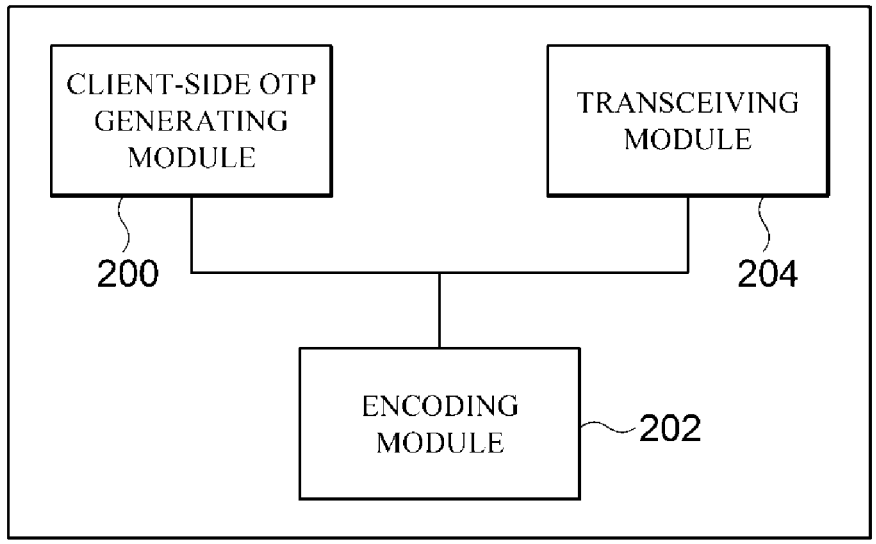
FIG. 2 is a block diagram showing a detailed configuration of a client 102 according to an embodiment of the present disclosure.

FIG. 2 is a block diagram showing a detailed configuration of a client 102 according to an embodiment of the present disclosure. As shown in FIG. 2, the client 102 includes a client-side OTP generating module 200, an encoding module 202, and a transceiving module 204.

The client-side OTP generating module 200 generates a client-side OTP using account information $A_o$ of the user and authentication request time information $T_a$.

The encoding module 202 generates an account encoding key $K_a$ from the authentication request time information $T_a$ using a previously set key generating algorithm and encodes the account information $A_o$ using the account encoding key $K_a$.

The transceiving module 202 transmits the client-side OTP and the encoded account information to the authentication server 104 and receives an authentication response corresponding to the authentication request from the authentication server 104.

Figure 3:
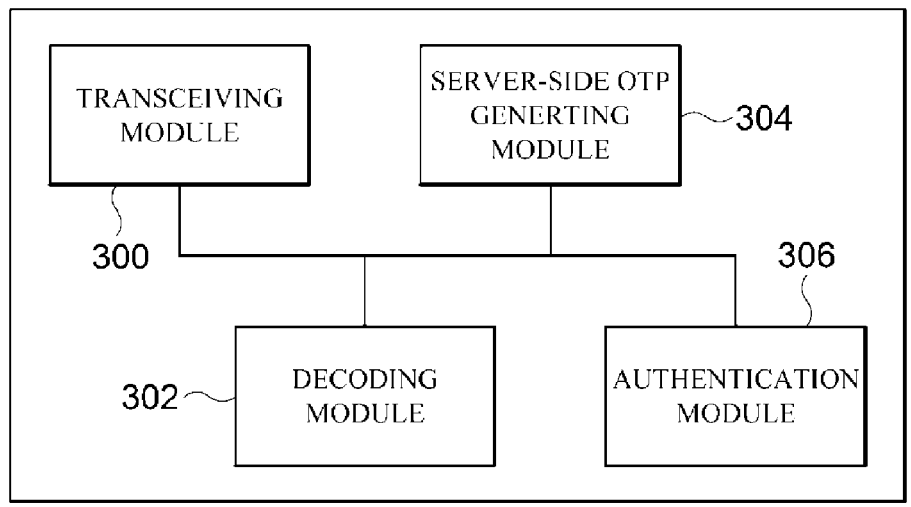
FIG. 3 is a block diagram showing a detailed configuration of an authentication server 104 according to an embodiment of the present disclosure.

FIG. 3 is a block diagram showing a detailed configuration of an authentication server 104 according to an embodiment of the present disclosure. As shown in FIG. 3, the authentication server 104 according to an embodiment of the present disclosure includes a transceiving module 300, a decoding module 302, a server-side OTP generating module 304, and an authentication module 306.

The transceiving module 300 receives an authentication request including the client-side OTP and the encoded account information from the client 102 and transmits an authentication result in response to the authentication request to the client.

The decoding module 302 decodes the encoded account information received from the transceiving module 300 to compute the account information and authentication request time therefrom. This will be described in more detail as follows.

First, the decoding module 302 generates a plurality of estimated OTP generation times based on the authentication request reception time. For example, when an estimated OTP generation estimation time is generated every 10 seconds for 180 seconds before and after the authentication request reception time, the decoding module 302 may generate 36 estimated OTP generation times, as follows.

$T_1$: $T - 180$ (where $T$ is the authentication request reception time)

$T_2$: $T - 170$ $T_3$: $T - 160$

...

$T_{36}$: $T + 170$

Next, the decoding module 302 generates a plurality of decoding keys from the respective estimated OTP generation times using a previously set key generating algorithm. As described above, the key generating algorithm is the same as that of the client 102. As the above example, 36 decoding keys are generated from 36 estimated OTP generation times $T_1$ to $T_{36}$, as follows:

$K_1, K_2, K_3, \ldots, K_{36}$.

When the decoding keys are generated, the decoding module 302 attempts to decode the encoded account information using a previously set decoding algorithm. Specifically, the decoding module 302 determines whether results obtained by sequentially applying the decoding keys to the decoding algorithm are consistent with one piece of previously stored account information of the client 102. If a decoding result using a specific decoding key is consistent with one piece of the previously stored account information, the decoding succeeds. If no decoding result is consistent with the previously stored account information, the decoding fails. When the decoding fails, the authentication module 306 determines that authentication for the authentication request fails.

When the decoding succeeds in the decoding attempt, the decoding module 302 sets an estimated OTP generation time corresponding to a successful decoding key as the authentication request time $T_a$. In the above example, when the result of performing decoding using decoding key $K_4$ is consistent with one piece of the previously stored account information, the decoding module 302 sets a time corresponding to $K_4$, that is, T-150 as the authentication request time $T_a$ at the side of the client 102.

Next, the server-side OTP generating module 304 generates a server-side OTP using the authentication request time and the account information of the client that are computed by decoding module 302. If there are a plurality of access tokens corresponding to the account information, the server-side OTP generating module 304 generates a plurality of server-side OTPs for the respective access tokens.

The authentication module 306 compares the client-side OTP included in the authentication request and the server-side OPT generated by the server-side OTP generating module 304 to authenticate the client 102. The authentication module 306 determines that the authentication performed in response to the authentication request has succeeded when the comparison result is that the server-side OTP is consistent with the client-side OTP and determines that the authentication has failed when the comparison result is that the server-side OTP is not consistent. If a plurality of server-side OTPs are generated by the server-side generating module 304, the authentication module 306 determines that the authentication has succeeded when any one of the plurality of server-side OTPs is consistent with the client-side OTP and determines that the authentication has failed when none of the plurality of server-side OTPs is consistent with the client-side OTP.

Figure 4:
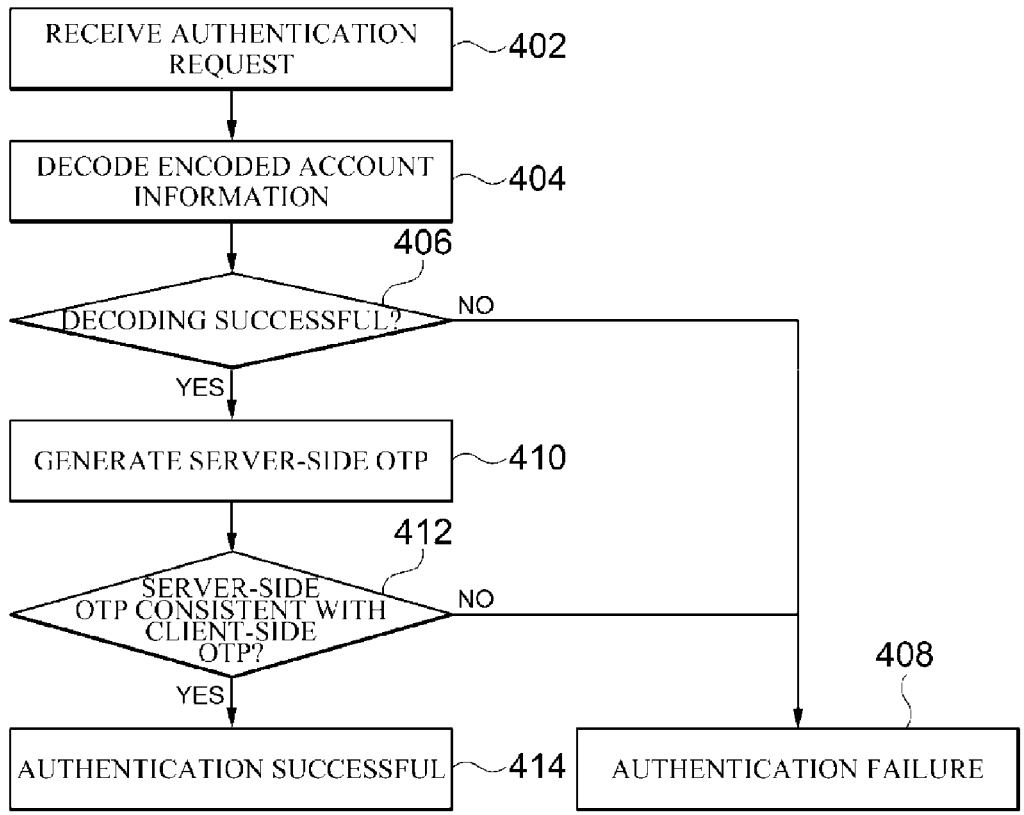
FIG. 4 is a flowchart for describing an authentication method by the authentication server 104 according to an embodiment of the present disclosure.

FIG. 4 is a flowchart showing an authentication method 400 by the authentication server 104 according to an embodiment of the present disclosure.

First, the transceiving module 300 receives an authentication request including a client-side OTP and encoded account information from the client 102 (402).

Next, the decoding module 302 decodes the encoded account information included in the authentication request to compute an authentication request time and account information of the client 102 (404). Specifically, the decoding module 302 is configured to generate a plurality of estimated OTP generation times based on a reception time of the authentication request, generate a plurality of decoding keys from the respective generated estimated OTP generation times, and decode the encoded account information using the plurality of decoding keys. When the decoding of the encoded account information succeeds, the decoding module 302 sets an estimated OTP generation time corresponding to a decoding key used for the successful decoding as the authentication request time. If the result of step 404 is that the decoding of the encoded account information has failed, the decoding module 302 determines that the authentication fails (406, 408).

However, on the contrary, when the decoding succeeds and thus the account information and the authentication request time are computed, the server-side OTP generating module 304 generates a server-side OTP using the computed account information of the client and authentication request time (410). In this case, when there are a plurality of access tokens corresponding to the account information, the server-side OTP generating module 304 may generate a plurality of server-side OTPs for the respective access tokens.

Subsequently, the authentication module 306 compares the client-side OTP included in the authentication request and the server-side OPT generated in step 406 to authenticate the client (412). Specifically, the authentication module 306 determines that the authentication succeeds when the client-side OTP is consistent with the server-side OTP (414) and determines that the authentication fails when the client-side OTP is not consistent with the server-side OTP (408). If a plurality of server-side OTPs are generated in step 406, the authentication module 306 determines that the authentication succeeds when any one of the plurality of server-side OTPs is consistent with the client-side OTP and determines that the authentication fails when none of the plurality of server-side OTPs is consistent with the client-side OTP.

Embodiments of the present disclosure may include a computer readable storage medium including a program for performing methods described in this specification on a computer. The computer readable recording medium may include a program instruction, a local data file, a local data structure, or a combination thereof. The medium may be designed and configured specifically for the present disclosure or can be publicly known and available to those who are skilled in the field of computer software. Examples of the computer readable recording medium include a magnetic medium, such as a hard disk, a floppy disk, and a magnetic tape, an optical recording medium, such as a CD-ROM, a DVD, etc., a magneto-optical medium such as a floptical disk, and a hardware device specially configured to store and perform a program instruction, such as a ROM, a RAM, a flash memory, etc. Examples of the program instruction include a high-level language code executable by a computer with an interpreter, in addition to a machine language code made by a compiler.

Although the invention has been described with reference to exemplary embodiments, it will be understood by those skilled in the art that various changes may be made without departing from the spirit or scope of the invention.

Thus, the scope of the present disclosure is to be determined by the following claims and their equivalents, and shall not be restricted or limited by the foregoing detailed description.

What is claimed is:

1. An authentication system comprising at least one hardware processor to implement:
   a transceiver configured to receive an authentication request including a client-side one time password (OTP) and encoded account information from a client and transmit an authentication result in response to the authentication request to the client;
   a decoder configured to decode the encoded account information to obtain account information of the client and an authentication request time, the authentication request time indicating a time at which the authentication request is generated;
   a server-side OTP generator configured to generate a server-side OTP based on the account information of the client and the authentication request time; and
   an authenticator configured to authenticate the client based on the client-side OTP included in the authentication request and the server-side OTP,
   wherein the decoder is configured to generate a plurality of estimated OTP generation times, the plurality of estimated OTP generation times indicating estimated times at which the OTP is generated, based on a reception time of the authentication request at the transceiver, generate a plurality of decoding keys corresponding to the respective estimated OTP generation times, and decode the encoded account information using the plurality of decoding keys, and
   wherein when the encoded account information is decoded by using a decoding key among the plurality of decoding keys, the decoder is configured to set an estimated OTP generation time corresponding to the decoding key as the authentication request time.

2. The authentication system of claim 1, wherein when a plurality of access tokens correspond to the account information, the server-side OTP generator generates a plurality of server-side OTPs for the respective access tokens.

3. The authentication system of claim 2, wherein the authenticator authenticates the client according to a match between the plurality of server-side OTPs and the client-side OTP.

4. An authentication method comprising:
   receiving, by an authentication server, an authentication request including a client-side one time password (OTP) and encoded account information from a client;
   decoding, by the authentication server, the encoded account information to obtain account information of the client and an authentication request time, the authentication request time indicating a time at which the authentication request is generated;
   generating, by the authentication server, a server-side OTP based on the account information of the client and the authentication request time; and
   authenticating, by the authentication server, the client based on the client-side OTP included in the authentication request and the server-side OTP,
   wherein the decoding comprises:
      generating a plurality of estimated OTP generation times, the plurality of estimated OTP generation times indicating estimated times at which the OTP is generated, based on a reception time of the authentication request;
      generating a plurality of decoding keys corresponding to the respective estimated OTP generation times; and
      decoding the encoded account information using the plurality of decoding keys, and
   wherein, when the encoded account information is decoded by using a decoding key among the plurality of decoding keys, an estimated OTP generation time corresponding to the decoding key is set as the authentication request time.

5. The authentication method of claim 4, wherein when a plurality of access tokens correspond to the account information, the generating comprises generating a plurality of server-side OTPs for the respective access tokens.

6. The authentication method of claim 5, wherein the authenticating comprises authenticating the client according to a match between the plurality of server-side OTPs and the client-side OTP.

7. A non-transitory computer-readable recording medium storing a computer program for executing the method of claim 4.

* * * * *